United States Patent
Qu et al.

(10) Patent No.: US 11,319,400 B2
(45) Date of Patent: May 3, 2022

(54) LOW-VISCOSITY HYDROXYL-TERMINATED RESIN WITH DIISOCYANATE AS A CORE, AND PREPARATION METHOD THEREFOR AND USE THEREOF

(71) Applicants: SOUTH CHINA UNIVERSITY OF TECHNOLOGY, Guangzhou (CN); CARPOLY CHEMICAL GROUP CO., LTD., Jiangmen (CN)

(72) Inventors: Jinqing Qu, Guangzhou (CN); Shan Huang, Guangzhou (CN); Yan'An Zhu, Jiangmen (CN); Ronghua Chen, Jiangmen (CN)

(73) Assignees: SOUTH CHINA UNIVERSITY OF TECHNOLOGY, Guangzhou (CN); CARPOLY CHEMICAL GROUP CO., LTD., Hangmen (CN)

( * ) Notice: Subject to any disclaimer, the term of this patent is extended or adjusted under 35 U.S.C. 154(b) by 399 days.

(21) Appl. No.: 16/475,393

(22) PCT Filed: Nov. 14, 2017

(86) PCT No.: PCT/CN2017/110893
§ 371 (c)(1),
(2) Date: Jul. 2, 2019

(87) PCT Pub. No.: WO2018/126795
PCT Pub. Date: Jul. 12, 2018

(65) Prior Publication Data
US 2019/0322792 A1    Oct. 24, 2019

(30) Foreign Application Priority Data
Jan. 3, 2017 (CN) .......................... 201710000816.8

(51) Int. Cl.
C08G 18/32 (2006.01)
C08G 18/48 (2006.01)
C08G 18/73 (2006.01)
C08G 18/75 (2006.01)
C09D 175/08 (2006.01)
C09D 175/04 (2006.01)
C08G 18/80 (2006.01)

(52) U.S. Cl.
CPC ..... *C08G 18/3215* (2013.01); *C08G 18/4825* (2013.01); *C08G 18/4829* (2013.01); *C08G 18/73* (2013.01); *C08G 18/758* (2013.01); *C08G 18/8029* (2013.01); *C09D 175/04* (2013.01); *C09D 175/08* (2013.01)

(58) Field of Classification Search
CPC ............ C08G 18/3215; C08G 18/4825; C08G 18/4829; C08G 18/73; C08G 18/758; C08G 18/8029; C09D 175/08; C09D 175/04
See application file for complete search history.

(56) References Cited

U.S. PATENT DOCUMENTS

| 3,454,622 A | * | 7/1969 | Schmidle | ............. | C08G 59/145 560/26 |
| 3,458,527 A | * | 7/1969 | Schmidle | ............. | C07D 413/04 548/231 |

FOREIGN PATENT DOCUMENTS

| CN | 1894299 | 1/2007 |
| CN | 102887987 | 1/2013 |
| CN | 103013421 | 4/2013 |
| CN | 103665313 | 3/2014 |
| CN | 104592483 | 5/2015 |
| CN | 106632946 | 5/2017 |

\* cited by examiner

*Primary Examiner* — Rabon A Sergent
(74) *Attorney, Agent, or Firm* — JMB Davis Ben-David

(57) ABSTRACT

The invention discloses a low-viscosity hydroxyl-terminated resin with diisocyanate as a core, and a preparation method therefor and the use thereof. During preparation, 1 mole of a micromolecular polyol is first modified with 1-3 moles of a monoepoxide so as to obtain a modified polyol; and then 2 moles of the modified polyol is reacted with 1-3 moles of a diisocyanate so as to obtain the hydroxyl-terminated resin. The prepared hydroxyl-terminated resin has the advantages of simple synthesis process, high solid content and low viscosity; the hydroxyl value thereof (at 80% solid mass content) is 140-300 mg KOH/g and the viscosity thereof at 25° C. (at 80% solid mass content) is 300-3000 cp. The hydroxyl-terminated resin is capable of crosslinking with a polyurethane curing agent containing isocyanate groups, and the prepared high solid content dual-component polyurethane coating has a VOC content of less than 380 g/L at the applicable viscosity thereof, and the performance of the coating meets the national standards for solvent based dual-component polyurethane woodenware coatings.

16 Claims, No Drawings

LOW-VISCOSITY HYDROXYL-TERMINATED RESIN WITH DIISOCYANATE AS A CORE, AND PREPARATION METHOD THEREFOR AND USE THEREOF

CROSS-REFERENCE TO RELATED APPLICATIONS

This is the U.S. National Stage of International Patent Application No. PCT/CN2017/110893 filed Nov. 14, 2017, which was published in Chinese under PCT Article 21(2), and which in turn claims the benefit of Chinese Patent Application No. 201710000816.8 filed Jan. 3, 2017.

TECHNICAL FIELD

The present invention relates to a hydroxy resin, in particularly to a low-viscosity hydroxyl-terminated resin with diisocyanate as a core, and more particularly to a method for preparing a low-viscosity hydroxyl-terminated resin by the reaction of a micromolecular polyol modified by a monoepoxide with a diisocyanate as a core, and the use of the resin in high solid content dual-component polyurethane coatings.

BACKGROUND

Dual-component polyurethane coating is widely used in many fields such as aircraft, automobiles, ships, bridges, industrial products, and indoor and outdoor furniture due to the physical properties such as excellent low-temperature flexibility, excellent wear resistance, chemical resistance, and high gloss. The hydroxy resin used in the dual-component polyurethane coatings generally includes a polyester resin, an alkyd resin, a hydroxy acrylic (acrylate) resin, etc. Since these resins have a too high viscosity at a high solid content, a large amount of organic solvents need to be added before using, and thus the dual-component polyurethane coatings prepared have relatively high VOC content during application, which cannot meet the new national requirements for the VOC content of coatings. At present, high solid content and low-viscosity polyurethane curing agents containing isocyanate groups have been put into market for many years, and the development of a low-viscosity hydroxy resin has become the key to preparing high solid content dual-component polyurethane coating and reducing its VOC content during application.

Chinese invention patent applications CN105733379A and CN104672366A respectively disclose a high solid content but low-viscosity acrylic resin and a preparation method therefor, wherein the hydroxy acrylic resins prepared by the above two techniques have a viscosity between 3000 and 6000 cp at 70% solid content, and the dual-component polyurethane coatings prepared thereby have good coating film performance, but because of the high viscosity of their hydroxy resins, the dual-component polyurethane coatings prepared thereby still have high VOC content during application.

Chinese invention patents CN102911349B and CN104262599B disclose a hydroxy resin for dual-component polyurethane having excellent coating properties by using a caprolactone, a fatty acid and a monoglycidyl ether to modify a hyperbranched hydroxy polyester, but both the above techniques use benzene-based water-carrying agents to promote the esterification reaction, with benzene-based compounds remaining in the polyester product; moreover, the above techniques use a heavy metal catalyst to catalyze the reaction of a terminal hydroxyl group with caprolactone, and the difficulty in completely removing the heavy metal catalyst will shorten the pot life of the prepared dual-component polyurethane coatings; and furthermore, the heavy metal catalyst has great harm to water, soil environment and human health, and the hydroxy polyesters prepared by the methods disclosed by the inventions can hardly be applied to the field of coatings for toys, containers for food and the like which have high environmental protection standards.

SUMMARY OF THE INVENTION

One of the objects of the present invention is to provide a low-viscosity hydroxyl-terminated resin prepared by using a micromolecular polyol, a monoepoxide and a diisocyanate as raw materials, wherein the hydroxyl-terminated resin has a hydroxyl value of 140-300 mg KOH/g at 80% solid mass content, and a viscosity of 300-3000 cp at 25° C. at 80% solid mass content.

A second object of the present invention is to provide a method for preparing a hydroxyl-terminated resin by reaction among a micromolecular polyol, a monoepoxide and a diisocyanate, the synthesis process is simple and environmentally friendly without any heavy metal catalyst and aromatic hydrocarbon-based solvent such as phenyl compounds. The prepared hydroxyl-terminated resin has the characteristics of low viscosity and high solid content.

A third object of the present invention is to provide an use of the low-viscosity hydroxyl-terminated resin in dual-component solvent based polyurethane coatings, and the polyurethane coating prepared from the hydroxyl-terminated resin has the characteristics of high gloss, high fullness, high hardness, and excellent gloss and color retention properties.

The object of the present invention is achieved by means of the following technical solutions:

A method for preparing a low-viscosity hydroxyl-terminated resin with diisocyanate as a core comprises the steps of:

(1) preparation of a modified polyol: adding 1 part by mole of a micromolecular polyol and 0-5 parts by mole of an organic solvent to a reactor, adding a Lewis acid catalyst, dropwise adding 1-3 parts of a monoepoxide at 40-70° C. over 1-5 h, and after completing the dropwise addition, continuing the reaction at 40-70° C. for 4-8 h; when the epoxy value of the reaction system is decreased to less than 1% of the initial mass content, terminating the reaction, adding distilled water to quench the Lewis acid catalyst, then adding a strong basic anion exchange resin and continuously stirring for 30-60 min to neutralize the acid catalyst, removing the strong basic anion exchange resin by filtration, and removing the distilled water and the organic solvent by distilling under reduced pressure at high vacuum condition to obtain a polyol modified by the monoepoxide, wherein the monoepoxide is one or more of butyl glycidyl ether, n-octyl glycidyl ether, isooctyl glycidyl ether, C8-10 alkyl glycidyl ether, decyl glycidyl ether, C10-12 alkyl glycidyl ether, phenyl glycidyl ether, o-tolyl glycidyl ether, p-tert-butylphenyl glycidyl ether, benzyl glycidyl ether, furfuryl glycidyl ether, epichlorohydrin, and glycidyl tertcarbonate; and (2) a low-viscosity hydroxyl-terminated resin: adding 2 parts by mole of the modified polyol prepared from step (1) to a reactor, adding an organic solvent in an amount of 15% to 30% by mass percent of the total mass of the reactants, adding 1-1.5 parts of a diisocyanate to the modified polyol at 50-90° C. over 1-3 h, after completing the dropwise addition, continuing the reaction at 50-90° C. for 2-6 h, and after the isocyanate group in the reaction system is completely reacted, terminating the reaction, and decreasing the temperature to obtain a hydroxyl-terminated resin having a solid mass content of 75% to 90%.

To further achieve the object of the present invention, preferably, the micromolecular polyol is ethylene glycol, 1,4-butanediol, 1,6-hexanediol, 2-butyl-2-ethyl-1,3-propanediol, neopentyl glycol, diethylene glycol, 2,4-diethyl-1,5-pentanediol, 1,4-cyclohexanediol, 1,4-cyclohexanedimethanol, trimethylolpropane, glycerol, diglycerol, ditrimethylolpropane, pentaerythritol, dipentaerythritol, xylitol, erythritol, mannitol, sorbitol, maltitol or lactitol; alternatively, the micromolecular polyol is a polyether polyol, polyester polyol, polycaprolactone polyol or polytetrahydrofuran polyol having an average molecular weight of 200-1000.

Preferably, the polyether polyol, polyester polyol, polycaprolactone polyol or polytetrahydrofuran polyol having an average molecular weight of 200-1000 is one or more of difunctional polyethylene glycol 200, polyethylene glycol 400, polyester polyol HS 2272, polycaprolactone polyol 205, polytetrahydrofuran polyol 650, trifunctional polyether polyol N303, polycaprolactone polyol 305, tetrafunctional polyether polyol HK-4110, and polycaprolactone polyol 410.

Preferably, the monoepoxide is one or more of butyl glycidyl ether, n-octyl glycidyl ether, isooctyl glycidyl ether, C8-10 alkyl glycidyl ether, decyl glycidyl ether, C10-12 alkyl glycidyl ether, phenyl glycidyl ether, o-tolyl glycidyl ether, p-tert-butylphenyl glycidyl ether, benzyl glycidyl ether, furfuryl glycidyl ether, epichlorohydrin, and glycidyl tertcarbonate.

Preferably, the diisocyanate compound is toluene diisocyanate, diphenylmethane diisocyanate, benzene dimethylene diisocyanate, tetramethylbenzene dimethylene diisocyanate, methylcyclohexyl diisocyanate, isophorone diisocyanate, dicyclohexylmethane diisocyanate, hexamethylene diisocyanate, and trimethylhexamethylene diisocyanate.

Preferably, the Lewis acid catalyst is one or more of boron trifluoride diethyl etherate ($BF_3.Et_2O$), boron trifluoride ethanol ($BF_3.EtOH$) and boron trifluoride tetrahydrofuran ($BF_3.THF$); and the Lewis acid catalyst is added in an amount of 2% to 6% by mole of the micromolecular polyol.

Preferably, the strongly basic anion exchange resin is a D201 type macroporous strong basic styrene anion exchange resin.

Preferably, both the organic solvents in step (1) and step (2) are one or more of ethyl acetate, butyl acetate, dioxane, propylene glycol methyl ether acetate, butanone, methyl isobutyl ketone, methyl isoamyl ketone, cyclohexanone, and isophorone.

A low-viscosity hydroxyl-terminated resin with diisocyanate as a core is obtained by the above preparation method, wherein the hydroxyl-terminated resin has a hydroxyl value of 140-300 mg KOH/g at 80% solid mass content, and a viscosity of 300-3000 cp at 25° C. at 80% solid mass content.

An use of the low-viscosity hydroxyl-terminated resin with diisocyanate as a core in coatings: the coatings comprise the hydroxyl-terminated resin and a polyurethane curing agent containing isocyanate groups; the NCO group in the polyurethane curing agent containing isocyanate groups and the OH group in the hydroxyl-terminated resin have a molar ratio of 0.8-1.2:1; the polyurethane curing agent containing isocyanate groups is one or more of toluene diisocyanate trimer, toluene diisocyanate/trimethylolpropane adduct, hexamethylene diisocyanate trimer, diphenylmethane diisocyanate monomer and diphenylmethane diisocyanate polymer curing agents.

The principle of the present invention is as follows:

(1) Preparation of a modified polyol: The modified polyol is obtained by initiating a ring-opening reaction of the epoxy group of a monoepoxide by the hydroxyl group of a micromolecular polyol with a Lewis acid as a catalyst. The present invention uses a Lewis acid catalyst to catalyze the ring-opening reaction between the epoxy functional group and the hydroxyl functional group instead of alkali metal and heavy metal ring-opening catalysts to avoid the influence of the introduction of alkali metal and heavy metal on the pot life of the dual-component polyurethane coatings; and the post-treatment process in the preparation of the modified polyol uses a strong basic anion exchange resin to neutralize the Lewis acid catalyst, wherein the strong basic anion exchange resin is a solid resin which can be conveniently removed by filtration, thereby avoiding the complex processes such as washing by alkali and liquid separation in the traditional process. Therefore, the process is simple and environmentally friendly.

(2) Preparation of a hydroxyl-terminated resin: The hydroxyl-terminated resin is obtained by reaction between the isocyanate group of a diisocyanate and the hydroxyl group of a modified polyol with controlled ratio of the diisocyanate and the modified polyol.

(3) By adjusting the type of the epoxy in the modified polyol, different side chain structures can be introduced into the modified polyol, and at the same time the viscosity of the modified polyol and the hydroxyl-terminated resin can be further reduced, and the performance of the hydroxyl-terminated resin can be adjusted. By adjusting the amount of the epoxy added and the proportions of primary and secondary hydroxyl groups in the modified polyol, reacting the primary hydroxyl group with the isocyanate group while retaining the secondary hydroxyl group, the pot life of the prepared dual-component polyurethane coatings is prolonged, and the problem of short pot life of conventional high solid content dual-component polyurethane coatings is solved.

(4) By changing the type and amount of the diisocyanate, different core molecule bridging structures can be introduced into the hydroxyl-terminated resin, the viscosity and properties of the hydroxyl-terminated resin can be adjusted, and therefore the physical and mechanical properties of the prepared dual-component polyurethane coatings can be adjusted.

In the prior art (CN105419718A, CN105419714A, and CN101838514B), the preparation of hydroxyl-terminated polyurethane mostly uses macromolecular diols such as polyether diols, polycaprolactone diols and polytetrahydrofuran diols having a molecular weight of 1000 or more and/or polyol, castor oil and the like as chain extenders, and the products prepared mostly have hydroxyl functionality of 2, which have a relatively high molecular weight and low hydroxyl value (average hydroxy functionality as low as about 2), and which usually can only be applied to an adhesive system, and cannot be used to prepare coatings with higher hardness requirements due to a large number of flexible long chains contained in their molecular structure. The present technique improves the average hydroxyl functionality (4 or more) and hydroxyl value of the prepared hydroxyl-terminated resin and reduces the content of the flexible long chains in the hydroxyl-terminated resin by compounding the micromolecular polyol; and at the same time, in order to reduce the viscosity of the hydroxyl-terminated resin, monoglycidyl ether is selected to modify the micromolecular polyol so that the primary hydroxyl group thereof is converted into secondary hydroxyl group, causing the reduction of the hydrogen-bond interaction between the hydroxyl groups, and side chain groups having a stronger space shielding effect are introduced, which reduces the viscosity of the hydroxyl-terminated resin without decrease of the hardness of the coating due to excessive flexible long chains when the hydroxyl-terminated resin is used in the preparation of the dual-component polyurethane coating.

Compared with the prior art, the present invention has the following advantages and beneficial effects:

(1) High solid content and low viscosity: compared with traditional polyester resin and alkyd resin for dual-component polyurethane coatings on the market, the hydroxyl-terminated resin synthesized by the present invention has a viscosity of only 300-3000 cp at 25° C. at 80% solid mass content; and it is beneficial to prepare high solid content dual-component polyurethane coatings and reduce the VOC content of the coatings during application, which are in line with the development trend of coatings.

(2) Excellent resin compatibility: the hydroxyl-terminated resin prepared by the invention has good compatibility with the hydroxy resin used in the traditional dual-component polyurethane coatings on the market, such as alkyd resin, polyester resin, hydroxy acrylic resin, polyether polyol and vegetable oil polyol, and due to its characteristics of high solid content and low viscosity, blending it with other hydroxy resins can improve the solid content during application and reduce VOC emissions.

(3) Excellent coating film performance: by adjusting the types and amounts of the micromolecular polyol, monoepoxide and diisocyanate, the properties of the hydroxyl-terminated resin can be conveniently adjusted. The hydroxyl-terminated resin prepared by the invention is easily crosslinked with a polyurethane curing agent to form a film, and the coating film has the characteristics of a high gloss (>95°), good flexibility (<2 mm), excellent impact resistance (50 cm), strong adhesion force (Level 1), high hardness (≥F), and excellent chemical resistance.

(4) Environmentally friendly synthesis process: a two-step method is used to synthesize the hydroxyl-terminated resin, and the raw materials are simple and easily obtained. The reaction process does not involve heavy metal catalysts or benzene-based solvents, which is simple and environmentally friendly.

DETAILED DESCRIPTION OF EMBODIMENTS

The present invention will be further described in conjunction with the examples of the present invention in order to provide a better understanding of the invention, and it should be noted that the examples do not limit the scope of protection of the present invention. The relevant performance test methods involved in the examples are as follows:

The viscosity of the hydroxyl-terminated resin was determined using a US BROOKFIELD LVT type rotary viscometer at 25° C. The epoxy value of the reaction system was detected according to the measurement method in the national standard "GB/T 4612-2008 Plastics—Epoxy—Determination of epoxy equivalent"; and the isocyanate content in the reaction system was detected according to the measurement method in the national standard "GB/T 12009.4-2016 Plastics—Aromatic isocyanates for use in the production of polyurethane—Part 4: Determination of isocyanate content". The coating performances including gloss, pencil hardness, pendulum hardness, flexibility, impact resistance, adhesion and chemical resistance were tested according to GB/T 9754-2007, GB/T 6739-2006, GB/T 1730-2007, GB/T 1731-1993, GB/T 20624.2-2006, GB/T 9286-1998 and GB/T 2893.1-2005, respectively. The pencil was a high-grade drawing pencil produced by Shanghai China First Pencil CO., Ltd. The instruments used were all produced in Tianjin Jingke Material Testing Machine CO., Ltd. The VOC content of the coatings was tested in accordance with GB/T 23985-2009.

Example 1

1. Raw Material Composition

The raw materials and ratios used in the preparation of a hydroxyl-terminated resin HTR-1 are shown in Table 1.

TABLE 1

| | |
|---|---|
| Trimethylolpropane | 268.4 g (2 mol) |
| Benzyl glycidyl ether | 456.0 g (2 mol) |
| Hexamethylene diisocyanate | 168.2 g (1 mol) |
| Methyl isoamyl ketone | 223.2 g |

2. Preparation

The preparation of the hydroxyl-terminated resin HTR-1 specifically comprises the following steps:

(1) To a four-necked flask equipped with a mechanical stirrer, a thermometer, an Allihn condenser and a nitrogen inlet were added 268.4 g of trimethylolpropane, 100 g of dioxane and 6 g of boron trifluoride diethyl etherate, 456.0 g of benzyl glycidyl ester was dropwise added at 40° C. under the protection of nitrogen over 3 h, and after completing the dropwise addition, the reaction was continued at 40° C.; when the epoxy value of the reaction system was decreased to be less than 1% of its initial mass content, the reaction was terminated, and 20 mL of distilled water was added to quench the boron trifluoride diethyl etherate catalyst. Then 60 g of a strong basic anion exchange resin was added and stirred for 30 min to neutralize the acid catalyst, after which the strong basic anion exchange resin was removed by filtration, the distilled water and the organic solvent were removed by distilling under reduced pressure at high vacuum condition, and the temperature was decreased to obtain a modified polyol.

(2) To a four-necked flask equipped with a mechanical stirrer, a thermometer, an Allihn condenser and a nitrogen inlet were added 724.4 g of the modified polyol prepared in step (1) and 223.2 g of methyl isoamyl ketone, 168.2 g of hexamethylene diisocyanate was dropwise added at 70° C. under the protection of nitrogen over 2 h, and after completing the dropwise addition, the reaction was continued at 70° C.; after the isocyanate group in the reaction system was detected to be completely reacted, the reaction was terminated, the temperature was decreased and the materials were discharged to obtain a hydroxyl-terminated resin HTR-1 having a solid mass content of 80%.

Monoepoxide is a class of compounds containing epoxy functional groups, which is commonly used as reactive diluents for epoxy resins to reduce the applicable viscosity of dual-component epoxy coatings due to its low viscosity. Epoxy group is a functional group with a ternary oxygen-containing structure and a large ring tension, and is suscep tible to a ring-opening reaction with a compound containing an active hydrogen (alcohol, primary/secondary amine, and carboxylic acid) to form a compound containing a secondary hydroxyl group; and the ring-opening reaction between the hydroxyl group of the micromolecular polyol and the epoxy functional group initiated by a Lewis acid catalyst forms a secondary hydroxyl group which is shielded by a long carbon chain, thereby lowering the viscosity of the modified polyol. The present invention uses the diisocyanate as a core and utilizes its isocyanate functional group to react with the hydroxyl functional group of the modified polyol to obtain hydroxyl-terminated resin bridged by diisocyanate, and improves the hydroxyl functionality of the hydroxy-terminated resin and prepares the low-viscosity hydroxyl-terminated resin by controlling the molar ratio of the modified polyol to the diisocyanate. The Lewis acid catalyst used in the preparation of the modified polyol is neutralized by a strong basic anion exchange resin, the strong basic anion exchange resin is a solid resin which can be conveniently removed by filtration and recycled, and the post-treatment process is simple; the organic solvent used in the preparation process of the modified polyol can be continuously used after simple drying for water removal, distillation and recovery process, and can be used as a diluent for the hydroxyl group-containing resin; and the preparation process of the hydroxyl-terminated resin does not use heavy metal catalysts. When the hydroxyl-terminated resin is applied to the dual-component polyurethane coatings, the pot life of the hydroxyl-terminated resin is not shortened without the introduction of heavy metal catalysts, and the whole reaction process has the characteristics of high efficiency and environmental protection.

3. Performance Testing

The hydroxyl-terminated resin HTR-1 is miscible with esters solvents such as ethyl acetate, butyl acetate and propylene glycol methyl ether acetate; aromatic solvents such as toluene and xylene; and ketone solvents such as acetone, butanone, cyclohexanone, methyl isobutyl ketone, and methyl isoamyl ketone. The hydroxyl-terminated resin HTR-1 is a colorless transparent viscous liquid having a hydroxyl value (at 80% solid mass content) of 201.3 mg KOH/g and a viscosity (at 80% solid mass content) of 1200 cp at 25° C.

4. Coating Preparation and Performance

On a mass basis, 50 g of the hydroxyl-terminated resin HTR-1, 57.9 g of isocyanate curing agent Desmodur L75, 0.55 g of a leveling agent BYK370, 0.55 g of a defoamer BYK141, and 31.1 g of a solvent propylene glycol methyl ether acetate were sequentially weighed and added to a dispersion cup, and after stirring and dispersing uniformly at a rotational speed of 600 r/min and standing still for defoaming, the obtained dual-component polyurethane coating was used to prepare a coating film on a wooden board, a tinplate sheet and a glass plate, respectively. The coating film was tested for performance after being cured and dried at room temperature for 7 days, and the results are shown in Table 2. The film performance of a dual-component polyurethane coating prepared from a commercially available alkyd resin H100C-80 using the same isocyanate curing agent Desmodur L75 is also listed in Table 2.

TABLE 2

|  | Resin Viscosity | VOC g/L | Pot life | Gloss (60°) | Pencil hardness | Pendulum hardness | Impact resistance | Flexibility | Adhesion force |
|---|---|---|---|---|---|---|---|---|---|
| HTR-1 | 1200 | 380 | 8 h | 98° | H | 0.76 | 50 cm | 1 mm | Level 1 |
| H100 C-80 | 55000 | 570 | 4 h | 96° | H | 0.73 | 50 cm | 1 mm | Level 1 |

As shown in Table 2, the dual-component polyurethane coating prepared from the hydroxyl-terminated resin HTR-1 meets the national standard "GB/T 23997-2009 Solvent based polyurethane wood coatings for indoor decorating and refurbishing". Comparing the properties of the low-viscosity hydroxyl-terminated resin HTR-1 prepared in this example with those of the conventional alkyd resin H100C-80, due to the lower hydroxyl activity of HTR-1, the pot life of the dual-component polyurethane coating prepared thereby is significantly prolonged, and at the same time, the film exhibits mechanical performance such as a high gloss, high hardness, excellent flexibility and adhesion force; and the hydroxyl-terminated resin prepared in this example has a higher hydroxyl functionality and hydroxyl value so that the prepared film has a higher hardness than that of the resin in the comparative example.

Traditional linear hydroxy polyester has a small average hydroxyl functionality, in order to achieve better physical and mechanical properties, its molecular weight is generally high and its viscosity is also very high at higher solid content, therefore the prepared dual-component coating requires a large amount of organic solvents for dilution to reduce the viscosity to meet the application requirements, and these organic solvents are gradually released to the air to pollute the environment during the film-forming process. Comparative example H100C-80 has a viscosity of up to 55000 cp at 80% solid mass content, and the prepared dual-component coating has a VOC content of 570 g/L during application; and the hydroxyl-terminated resin HTR-1 prepared in this example has a solution viscosity of only about 1200 cp and a theoretical hydroxyl functionality of 4 at 80% solid content, the VOC content of the dual-component polyurethane coating prepared thereby during application is only 380 g/L, which meets the new national standard for the VOC content of coatings. Therefore, this example overcomes the dilemma of high solid content of coating and limited amount of solvent used.

Example 2

1. Raw Material Composition

The raw materials and ratios used in the preparation of a hydroxyl-terminated resin HTR-2 are shown in Table 3.

TABLE 3

| Trimethylolpropane | 134.2 g (1 mol) |
|---|---|
| Glycerol | 92.1 g (1 mol) |
| Benzyl glycidyl ether | 456.0 g (2 mol) |
| Hexamethylene diisocyanate | 168.2 g (1 mol) |
| Methyl isoamyl ketone | 212.6 g |

2. Preparation

The preparation of the hydroxyl-terminated resin HTR-2 specifically comprises the following steps:

(1) To a four-necked flask equipped with mechanical stirring, a thermometer, an Allihn condenser and a nitrogen inlet were added 134.2 g of trimethylolpropane, 92.1 g of glycerol, 60 g of butyl acetate and 6 g of boron trifluoride diethyl etherate, 456.0 g of benzyl glycidyl ester was dropwise added at 60° C. under the protection of nitrogen over 2 h, and after completing the dropwise addition, the reaction was continued at 60° C.; when the epoxy value of the reaction system was decreased to be less than 1% of its initial mass content, the reaction was terminated, 20 mL of distilled water was added to quench the boron trifluoride diethyl etherate catalyst, then 60 g of a strong basic anion exchange resin was added and stirred for 30 min to neutralize the acid catalyst, then the strong basic anion exchange resin was removed by filtration, the distilled water and the organic solvent were removed by distilling under reduced pressure at high vacuum conditions, and the temperature was decreased to obtain a modified polyol.

(2) To a four-necked flask equipped with mechanical stirring, a thermometer, an Allihn condenser and a nitrogen inlet were added 682.3 g of the modified polyol prepared in step (1) and 212.6 g of methyl isoamyl ketone, 168.2 g of hexamethylene diisocyanate was dropwise added at 60° C. under the protection of nitrogen over 2 h, and after completing the dropwise addition, the reaction was continued at 60° C.; after the isocyanate group in the reaction system was detected to be completely reacted, the reaction was terminated, the temperature was decreased and the materials were discharged to obtain a hydroxyl-terminated resin HTR-2 having a solid mass content of 80%.

3. Performance Testing

The hydroxyl-terminated resin HTR-2 may be miscible with a lipid solvent such as ethyl acetate, butyl acetate and propylene glycol methyl ether acetate, an aromatic hydrocarbon solvent such as toluene and xylene, and a ketone solvent such as acetone, butanone, cyclohexanone, methyl isobutyl ketone, and methyl isoamyl ketone. The hydroxyl-terminated resin HTR-2 is a colorless transparent viscous liquid having a hydroxyl value (at 80% solid mass content) of 211.0 mg KOH/g and a viscosity (at 80% solid mass content) of 1250 cp at 25° C.

4. Coating Formulation and Performance

On a mass basis, 50 g of the hydroxyl-terminated resin HTR-2, 60.8 g of an isocyanate curing agent Desmodur L75, 0.55 g of a leveling agent BYK370, 0.55 g of a defoamer BYK141, and 31.9 g of a solvent propylene glycol methyl ether acetate were sequentially weighed and added to a dispersion cup, and after stirring and dispersing uniformly at a rotational speed of 600 r/min and standing still for defoaming, the obtained dual-component polyurethane coating was used to prepare a coating film on a wooden board, a tinplate sheet and a glass plate, respectively. The coating film was tested for performance after being cured and dried at room temperature for 7 days, and the results are shown in Table 4.

TABLE 4

| Gloss (60°) | Pencil hardness | Pendulum hardness | Impact resistance | Flexibility | Adhesion force |
|---|---|---|---|---|---|
| 97° | H | 0.78 | 50 cm | 1 mm | Level 1 |

As shown in Table 4, the dual-component polyurethane coating prepared from the hydroxyl-terminated resin HTR-2 meets the national standard "GB/T 23997-2009 Solvent based polyurethane wood coatings for indoor decorating and refurbishing".

Example 3

1. Raw Material Composition

The raw materials and ratios used in the preparation of a hydroxyl-terminated resin HTR-3 are shown in Table 5.

TABLE 5

| Trimethylolpropane | 134.2 g (1 mol) |
|---|---|
| Glycerol | 92.1 g (1 mol) |
| Phenyl glycidyl ether | 312.6 g (2 mol) |
| Hexamethylene diisocyanate | 168.2 g (1 mol) |
| Methyl isoamyl ketone | 176.8 g |

2. Preparation

The preparation of the hydroxyl-terminated resin HTR-3 specifically comprises the following steps:

(1) To a four-necked flask equipped with mechanical stirring, a thermometer, an Allihn condenser and a nitrogen inlet were added 134.2 g of trimethylolpropane, 92.1 g of glycerol, 60 g of dioxane and 6 g of boron trifluoride diethyl etherate, 312.6 g of phenyl glycidyl ester was dropwise added at 65° C. under the protection of nitrogen over 2 h, and after completing the dropwise addition, the reaction was continued at 65° C.; when the epoxy value of the reaction system was decreased to be less than 1% of its initial mass content, the reaction was terminated, 20 mL of distilled water was added to quench the boron trifluoride diethyl etherate catalyst, then 60 g of a strong basic anion exchange resin was added and stirred for 30 min to neutralize the acid catalyst, then the strong basic anion exchange resin was removed by filtration, the distilled water and the organic solvent were removed by distilling under reduced pressure at high vacuum conditions, and the temperature was decreased to obtain a modified polyol.

(2) To a four-necked flask equipped with mechanical stirring, a thermometer, an Allihn condenser and a nitrogen inlet were added 538.9 g of the modified polyol prepared in step (1) and 176.8 g of methyl isoamyl ketone, 168.2 g of hexamethylene diisocyanate was dropwise added at 80° C. under the protection of nitrogen over 1.5 h, and after completing the dropwise addition, the reaction was continued at 80° C.; after the isocyanate group in the reaction system was detected to be completely reacted, the reaction was terminated, the temperature was decreased and the materials were discharged to obtain a hydroxyl-terminated resin HTR-3 having a solid mass content of 80%.

3. Performance Testing

The hydroxyl-terminated resin HTR-3 may be miscible with a lipid solvent such as ethyl acetate, butyl acetate and propylene glycol methyl ether acetate, an aromatic hydrocarbon solvent such as toluene and xylene, and a ketone solvent such as acetone, butanone, cyclohexanone, methyl isobutyl ketone, and methyl isoamyl ketone. The hydroxyl-terminated resin HTR-3 is a colorless transparent viscous liquid having a hydroxyl value (at 80% solid mass content) of 253.9 mg KOH/g and a viscosity (at 80% solid mass content) of 2000 cp at 25° C.

4. Coating Formulation and Performance

On a mass basis, 50 g of the hydroxyl-terminated resin HTR-3, 73.1 g of an isocyanate curing agent Desmodur L75, 0.60 g of a leveling agent BYK370, 0.60 g of a defoamer BYK141, and 35.0 g of a solvent propylene glycol methyl ether acetate were sequentially weighed and added to a dispersion cup, and after stirring and dispersing uniformly at a rotational speed of 600 r/min and standing still for defoaming, the obtained dual-component polyurethane coating was used to prepare a coating film on a wooden board, a tinplate sheet and a glass plate, respectively. The coating film was tested for performance after being cured and dried at room temperature for 7 days, and the results are shown in Table 6.

TABLE 6

| Gloss (60°) | Pencil hardness | Pendulum hardness | Impact resistance | Flexibility | Adhesion force |
|---|---|---|---|---|---|
| 98° | 2H | 0.82 | 50 cm | 1 mm | Level 1 |

As shown in Table 6, the dual-component polyurethane coating prepared from the hydroxyl-terminated resin HTR-3 meets the national standard "GB/T 23997-2009 Solvent based polyurethane wood coatings for indoor decorating and refurbishing".

Example 4

1. Raw Material Composition

The raw materials and ratios used in the preparation of a hydroxyl-terminated resin HTR-4 are shown in Table 7.

TABLE 7

| Ditrimethylolpropane | 250.3 g (1 mol) |
| Diethylene glycol | 106.1 g (1 mol) |
| Octyl glycidyl ether | 390.0 g (2 mol) |
| Hexamethylene diisocyanate | 168.2 g (1 mol) |
| Methyl isoamyl ketone | 245.2 g |

2. Preparation

The preparation of the hydroxyl-terminated resin HTR-4 specifically comprises the following steps:

(1) To a four-necked flask equipped with mechanical stirring, a thermometer, an Allihn condenser and a nitrogen inlet were added 250.3 g of ditrimethylolpropane, 106.1 g of diethylene glycol, 100 g of ethyl acetate and 6 g of boron trifluoride tetrahydrofuran, 390.0 g of octyl glycidyl ester was dropwise added at 50° C. under the protection of nitrogen over 3 h, and after completing the dropwise addition, the reaction was continued at 50° C.; when the epoxy value of the reaction system was decreased to be less than 1% of its initial mass content, the reaction was terminated, 20 mL of distilled water was added to quench the boron trifluoride tetrahydrofuran catalyst, then 60 g of a strong basic anion exchange resin was added and stirred for 30 min to neutralize the acid catalyst, then the strong basic anion exchange resin was removed by filtration, the distilled water and the organic solvent were removed by distilling under reduced pressure at high vacuum conditions, and the temperature was decreased to obtain a modified polyol.

(2) To a four-necked flask equipped with mechanical stirring, a thermometer, an Allihn condenser and a nitrogen inlet were added 746.4 g of the modified polyol prepared in step (1) and 245.2 g of methyl isoamyl ketone, 168.2 g of hexamethylene diisocyanate was dropwise added at 50° C. under the protection of nitrogen over 3 h, and after completing the dropwise addition, the reaction was continued at 50° C.; after the isocyanate group in the reaction system was detected to be completely reacted, the reaction was terminated, the temperature was decreased and the materials were discharged to obtain a hydroxyl-terminated resin HTR-4 having a solid mass content of 80%.

3. Performance Testing

The hydroxyl-terminated resin HTR-4 may be miscible with a lipid solvent such as ethyl acetate, butyl acetate and propylene glycol methyl ether acetate, an aromatic hydrocarbon solvent such as toluene and xylene, and a ketone solvent such as acetone, butanone, cyclohexanone, methyl isobutyl ketone, and methyl isoamyl ketone. The hydroxyl-terminated resin HTR-4 is a colorless transparent viscous liquid having a hydroxyl value (at 80% solid mass content) of 196.4 mg KOH/g and a viscosity (at 80% solid mass content) of 800 cp at 25° C.

4. Coating Formulation and Performance

On a mass basis, 50 g of the hydroxyl-terminated resin HTR-4, 56.6 g of an isocyanate curing agent Desmodur L75, 0.55 g of a leveling agent BYK370, 0.55 g of a defoamer BYK141, and 30.8 g of a solvent propylene glycol methyl ether acetate were sequentially weighed and added to a dispersion cup, and after stirring and dispersing uniformly at a rotational speed of 600 r/min and standing still for defoaming, the obtained dual-component polyurethane coating was used to prepare a coating film on a wooden board, a tinplate sheet and a glass plate, respectively. The coating film was tested for performance after being cured and dried at room temperature for 7 days, and the results are shown in Table 8.

TABLE 8

| Gloss (60°) | Pencil hardness | Pendulum hardness | Impact resistance | Flexibility | Adhesion force |
|---|---|---|---|---|---|
| 98° | H | 0.76 | 50 cm | 1 mm | Level 1 |

As shown in Table 8, the dual-component polyurethane coating prepared from the hydroxyl-terminated resin HTR-4 meets the national standard "GB/T 23997-2009 Solvent based polyurethane wood coatings for indoor decorating and refurbishing".

Example 5

1. Raw Material Composition

The raw materials and ratios used in the preparation of a hydroxyl-terminated resin HTR-5 are shown in Table 9.

TABLE 9

| Ditrimethylolpropane | 250.3 g (1 mol) |
| Glycerol | 92.1 g (1 mol) |
| Phenyl glycidyl ether | 312.6 g (2 mol) |
| Hexamethylene diisocyanate | 168.2 g (1 mol) |
| Methyl isoamyl ketone | 205.8 g |

2. Preparation

The preparation of the hydroxyl-terminated resin HTR-5 specifically comprises the following steps:

(1) To a four-necked flask equipped with mechanical stirring, a thermometer, an Allihn condenser and a nitrogen inlet were added 250.3 g of ditrimethylolpropane, 92.1 g of glycerol, 120 g of dioxane and 6 g of boron trifluoride tetrahydrofuran, 312.6 g of phenyl glycidyl ester was dropwise added at 60° C. under the protection of nitrogen over 2 h, and after completing the dropwise addition, the reaction was continued at 60° C.; when the epoxy value of the reaction system was decreased to be less than 1% of its initial mass content, the reaction was terminated, 20 mL of distilled water was added to quench the boron trifluoride tetrahydrofuran catalyst, then 60 g of a strong basic anion exchange resin was added and stirred for 30 min to neutralize the acid catalyst, then the strong basic anion exchange resin was removed by filtration, the distilled water and the organic solvent were removed by distilling under reduced pressure at high vacuum conditions, and the temperature was decreased to obtain a modified polyol.

(2) To a four-necked flask equipped with mechanical stirring, a thermometer, an Allihn condenser and a nitrogen inlet were added 655 g of the modified polyol prepared in step (1) and 205.8 g of methyl isoamyl ketone, 168.2 g of hexamethylene diisocyanate was dropwise added at 60° C. under the protection of nitrogen over 2 h, and after completing the dropwise addition, the reaction was continued at 60° C.; after the isocyanate group in the reaction system was detected to be completely reacted, the reaction was terminated, the temperature was decreased and the materials were discharged to obtain a hydroxyl-terminated resin HTR-5 having a solid mass content of 80%.

3. Performance Testing

The hydroxyl-terminated resin HTR-5 may be miscible with a lipid solvent such as ethyl acetate, butyl acetate and propylene glycol methyl ether acetate, an aromatic hydrocarbon solvent such as toluene and xylene, and a ketone solvent such as acetone, butanone, cyclohexanone, methyl isobutyl ketone, and methyl isoamyl ketone. The hydroxyl-terminated resin HTR-5 is a colorless transparent viscous liquid having a hydroxyl value (at 80% solid mass content) of 272.8 mg KOH/g and a viscosity (at 80% solid mass content) of 2800 cp at 25° C.

4. Coating Formulation and Performance

On a mass basis, 50 g of the hydroxyl-terminated resin HTR-5, 78.5 g of an isocyanate curing agent Desmodur L75, 0.65 g of a leveling agent BYK370, 0.65 g of a defoamer BYK141, and 36.3 g of a solvent propylene glycol methyl ether acetate were sequentially weighed and added to a dispersion cup, and after stirring and dispersing uniformly at a rotational speed of 600 r/min and standing still for defoaming, the obtained dual-component polyurethane coating was used to prepare a coating film on a wooden board, a tinplate sheet and a glass plate, respectively. The coating film was tested for performance after being cured and dried at room temperature for 7 days, and the results are shown in Table 10.

TABLE 10

| Gloss (60°) | Pencil hardness | Pendulum hardness | Impact resistance | Flexibility | Adhesion force |
|---|---|---|---|---|---|
| 98° | 2H | 0.84 | 45 cm | 2 mm | Level 1 |

As shown in Table 10, the dual-component polyurethane coating prepared from the hydroxyl-terminated resin HTR-10 meets the national standard "GB/T 23997-2009 Solvent based polyurethane wood coatings for indoor decorating and refurbishing".

Example 6

1. Raw Material Composition

The raw materials and ratios used in the preparation of a hydroxyl-terminated resin HTR-6 are shown in Table 11.

TABLE 11

| Erythritol | 122.1 g (1 mol) |
| Glycerol | 92.1 g (1 mol) |

TABLE 11-continued

| Benzyl glycidyl ether | 456.0 g (2 mol) |
| Dicyclohexylmethane diisocyanate | 262.4 g (1 mol) |
| Methyl isoamyl ketone | 233.2 g |

2. Preparation

The preparation of the hydroxyl-terminated resin HTR-6 specifically comprises the following steps:

(1) To a four-necked flask equipped with mechanical stirring, a thermometer, an Allihn condenser and a nitrogen inlet were added 122.1 g of erythritol, 92.1 g of glycerol, 120 g of dioxane and 6 g of boron trifluoride tetrahydrofuran, 456.0 g of benzyl glycidyl ester was dropwise added at 70° C. under the protection of nitrogen over 2 h, and after completing the dropwise addition, the reaction was continued at 70° C.; when the epoxy value of the reaction system was decreased to be less than 1% of its initial mass content, the reaction was terminated, 20 mL of distilled water was added to quench the boron trifluoride tetrahydrofuran catalyst, then 60 g of a strong basic anion exchange resin was added and stirred for 30 min to neutralize the acid catalyst, then the strong basic anion exchange resin was removed by filtration, the distilled water and the organic solvent were removed by distilling under reduced pressure at high vacuum conditions, and the temperature was decreased to obtain a modified polyol.

(2) To a four-necked flask equipped with mechanical stirring, a thermometer, an Allihn condenser and a nitrogen inlet were added 670.2 g of the modified polyol prepared in step (1) and 233.2 g of methyl isoamyl ketone, 262.4 g of dicyclohexylmethane diisocyanate was dropwise added at 80° C. under the protection of nitrogen over 1.5 h, and after completing the dropwise addition, the reaction was continued at 80° C.; after the isocyanate group in the reaction system was detected to be completely reacted, the reaction was terminated, the temperature was decreased and the materials were discharged to obtain a hydroxyl-terminated resin HTR-6 having a solid mass content of 80%.

3. Performance Testing

The hydroxyl-terminated resin HTR-6 may be miscible with a lipid solvent such as ethyl acetate, butyl acetate and propylene glycol methyl ether acetate, an aromatic hydrocarbon solvent such as toluene and xylene, and a ketone solvent such as acetone, butanone, cyclohexanone, methyl isobutyl ketone, and methyl isoamyl ketone. The hydroxyl-terminated resin HTR-6 is a colorless transparent viscous liquid having a hydroxyl value (at 80% solid mass content) of 240.8 mg KOH/g and a viscosity (at 80% solid mass content) of 2480 cp at 25° C.

4. Coating Formulation and Performance

On a mass basis, 50 g of the hydroxyl-terminated resin HTR-6, 69.3 g of an isocyanate curing agent Desmodur L75, 0.65 g of a leveling agent BYK370, 0.65 g of a defoamer BYK141, and 34.0 g of a solvent propylene glycol methyl ether acetate were sequentially weighed and added to a dispersion cup, and after stirring and dispersing uniformly at a rotational speed of 600 r/min and standing still for defoaming, the obtained dual-component polyurethane coating was used to prepare a coating film on a wooden board, a tinplate sheet and a glass plate, respectively. The coating film was tested for performance after being cured and dried at room temperature for 7 days, and the results are shown in Table 12.

TABLE 12

| Gloss (60°) | Pencil hardness | Pendulum hardness | Impact resistance | Flexibility | Adhesion force |
|---|---|---|---|---|---|
| 98° | 2H | 0.82 | 50 cm | 1 mm | Level 1 |

As shown in Table 12, the dual-component polyurethane coating prepared from the hydroxyl-terminated resin HTR-6 meets the national standard "GB/T 23997-2009 Solvent based polyurethane wood coatings for indoor decorating and refurbishing".

Example 7

1. Raw Material Composition

The raw materials and ratios used in the preparation of a hydroxyl-terminated resin HTR-7 are shown in Table 13.

TABLE 13

| Polyether polyol N303 | 374.6 g (1 mol) |
|---|---|
| Sorbitol | 182.2 g (1 mol) |
| Glycidyl tertcarbonate | 750 g (3 mol) |
| Dicyclohexylmethane diisocyanate | 262.4 g (1 mol) |
| Methyl isoamyl ketone | 392.3 g |

2. Preparation

The preparation of the hydroxyl-terminated resin HTR-7 specifically comprises the following steps:

(1) To a four-necked flask equipped with mechanical stirring, a thermometer, an Allihn condenser and a nitrogen inlet were added 374.6 g of polyether polyol N303, 182.2 g of sorbitol, 80 g of dioxane and 5.6 g of boron trifluoride ethanol, 750 g of glycidyl tertcarbonate was dropwise added at 40° C. under the protection of nitrogen over 4 h, and after completing the dropwise addition, the reaction was continued at 70° C.; when the epoxy value of the reaction system was decreased to be less than 1% of its initial mass content, the reaction was terminated, 20 mL of distilled water was added to quench the boron trifluoride ethanol catalyst, then 60 g of a strong basic anion exchange resin was added and stirred for 30 min to neutralize the acid catalyst, then the strong basic anion exchange resin was removed by filtration, the distilled water and the organic solvent were removed by distilling under reduced pressure at high vacuum conditions, and the temperature was decreased to obtain a modified polyol.

(2) To a four-necked flask equipped with mechanical stirring, a thermometer, an Allihn condenser and a nitrogen inlet were added 1306.8 g of the modified polyol prepared in step (1) and 392.3 g of methyl isoamyl ketone, 262.4 g of dicyclohexylmethane diisocyanate was dropwise added at 60° C. under the protection of nitrogen over 2 h, and after completing the dropwise addition, the reaction was continued at 80° C.; after the isocyanate group in the reaction system was detected to be completely reacted, the reaction was terminated, the temperature was decreased and the materials were discharged to obtain a hydroxyl-terminated resin HTR-7 having a solid mass content of 80%.

3. Performance Testing

The hydroxyl-terminated resin HTR-7 may be miscible with a lipid solvent such as ethyl acetate, butyl acetate and propylene glycol methyl ether acetate, an aromatic hydrocarbon solvent such as toluene and xylene, and a ketone solvent such as acetone, butanone, cyclohexanone, methyl isobutyl ketone, and methyl isoamyl ketone. The hydroxyl-terminated resin HTR-7 is a colorless transparent viscous liquid having a hydroxyl value (at 80% solid mass content) of 200.3 mg KOH/g and a viscosity (at 80% solid mass content) of 2800 cp at 25° C.

4. Coating Formulation and Performance

On a mass basis, 50 g of the hydroxyl-terminated resin HTR-7, 57.7 g of an isocyanate curing agent Desmodur L75, 0.55 g of a leveling agent BYK370, 0.55 g of a defoamer BYK141, and 33.8 g of a solvent propylene glycol methyl ether acetate were sequentially weighed and added to a dispersion cup, and after stirring and dispersing uniformly at a rotational speed of 600 r/min and standing still for defoaming, the obtained dual-component polyurethane coating was used to prepare a coating film on a wooden board, a tinplate sheet and a glass plate, respectively. The coating film was tested for performance after being cured and dried at room temperature for 7 days, and the results are shown in Table 14.

TABLE 14

| Gloss (60°) | Pencil hardness | Pendulum hardness | Impact resistance | Flexibility | Adhesion force |
|---|---|---|---|---|---|
| 98° | H | 0.76 | 50 cm | 1 mm | Level 1 |

As shown in Table 14, the dual-component polyurethane coating prepared from the hydroxyl-terminated resin HTR-7 meets the national standard "GB/T 23997-2009 Solvent based polyurethane wood coatings for indoor decorating and refurbishing".

Example 8

1. Raw Material Composition

The raw materials and ratios used in the preparation of a hydroxyl-terminated resin HTR-8 are shown in Table 15.

TABLE 15

| Polyether polyol HK-4110 | 498.7 g (1 mol) |
|---|---|
| Diglycerol | 165.0 g (1 mol) |
| Benzyl glycidyl ether | 456.0 g (2 mol) |
| Dicyclohexylmethane diisocyanate | 262.4 g (1 mol) |
| Methyl isoamyl ketone | 345.5 g |

2. Preparation

The preparation of the hydroxyl-terminated resin HTR-8 specifically comprises the following steps:

(1) To a four-necked flask equipped with mechanical stirring, a thermometer, an Allihn condenser and a nitrogen inlet were added 498.7 g of polyether polyol HK-4110, 165.0 g of diglycerol, 60 g of dioxane and 5.6 g of boron trifluoride ethanol, 456.0 g of benzyl glycidyl ether was dropwise added at 40° C. under the protection of nitrogen over 5 h, and after completing the dropwise addition, the reaction was continued at 70° C.; when the epoxy value of the reaction system was decreased to be less than 1% of its initial mass content, the reaction was terminated, 20 mL of distilled water was added to quench the boron trifluoride ethanol catalyst, then 60 g of a strong basic anion exchange resin was added and stirred for 30 min to neutralize the acid catalyst, then the strong basic anion exchange resin was removed by filtration, the distilled water and the organic solvent were removed by distilling under reduced pressure at high vacuum conditions, and the temperature was decreased to obtain a modified polyol.

(2) To a four-necked flask equipped with mechanical stirring, a thermometer, an Allihn condenser and a nitrogen inlet were added 1119.7 g of the modified polyol prepared in step (1) and 345.5 g of methyl isoamyl ketone, 262.4 g of dicyclohexylmethane diisocyanate was dropwise added at 90° C. under the protection of nitrogen over 1.5 h, and after completing the dropwise addition, the reaction was continued at 90° C.; after the isocyanate group in the reaction system was detected to be completely reacted, the reaction was terminated, the temperature was decreased and the materials were discharged to obtain a hydroxyl-terminated resin HTR-8 having a solid mass content of 80%.

3. Performance Testing

The hydroxyl-terminated resin HTR-8 may be miscible with a lipid solvent such as ethyl acetate, butyl acetate and propylene glycol methyl ether acetate, an aromatic hydrocarbon solvent such as toluene and xylene, and a ketone solvent such as acetone, butanone, cyclohexanone, methyl isobutyl ketone, and methyl isoamyl ketone. The hydroxyl-terminated resin HTR-8 is a colorless transparent viscous liquid having a hydroxyl value (at 80% solid mass content) of 194.8 mg KOH/g and a viscosity (at 80% solid mass content) of 1080 cp at 25° C.

4. Coating Formulation and Performance

On a mass basis, 50 g of the hydroxyl-terminated resin HTR-8, 56.1 g of an isocyanate curing agent Desmodur L75, 0.55 g of a leveling agent BYK370, 0.55 g of a defoamer BYK141, and 30.7 g of a solvent propylene glycol methyl ether acetate were sequentially weighed and added to a dispersion cup, and after stirring and dispersing uniformly at a rotational speed of 600 r/min and standing still for defoaming, the obtained dual-component polyurethane coating was used to prepare a coating film on a wooden board, a tinplate sheet and a glass plate, respectively. The coating film was tested for performance after being cured and dried at room temperature for 7 days, and the results are shown in Table 16.

TABLE 16

| Gloss (60°) | Pencil hardness | Pendulum hardness | Impact resistance | Flexibility | Adhesion force |
|---|---|---|---|---|---|
| 98° | H | 0.74 | 50 cm | 1 mm | Level 1 |

As shown in Table 16, the dual-component polyurethane coating prepared from the hydroxyl-terminated resin HTR-8 meets the national standard "GB/T 23997-2009 Solvent based polyurethane wood coatings for indoor decorating and refurbishing".

Example 9

1. Raw Material Composition

The raw materials and ratios used in the preparation of a hydroxyl-terminated resin HTR-9 are shown in Table 17.

TABLE 17

| Diglycerol | 330.0 g (2 mol) |
| Benzyl glycidyl ether | 684.0 g (3 mol) |
| Hexamethylene diisocyanate | 168.2 g (1 mol) |
| Methyl isoamyl ketone | 295.5 g |

2. Preparation

The preparation of the hydroxyl-terminated resin HTR-9 specifically comprises the following steps:

(1) To a four-necked flask equipped with mechanical stirring, a thermometer, an Allihn condenser and a nitrogen inlet were added 330 g of diglycerol, 40 g of dioxane and 9 g of boron trifluoride diethyl etherate, 684.0 g of benzyl glycidyl ester was dropwise added at 60° C. under the protection of nitrogen over 4 h, and after completing the dropwise addition, the reaction was continued at 60° C.; when the epoxy value of the reaction system was decreased to be less than 1% of its initial mass content, the reaction was terminated, 30 mL of distilled water was added to quench the boron trifluoride diethyl etherate catalyst, then 90 g of a strong basic anion exchange resin was added and stirred for 30 min to neutralize the acid catalyst, then the strong basic anion exchange resin was removed by filtration, the distilled water and the organic solvent were removed by distilling under reduced pressure at high vacuum conditions, and the temperature was decreased to obtain a modified polyol.

(2) To a four-necked flask equipped with mechanical stirring, a thermometer, an Allihn condenser and a nitrogen inlet were added 1014.0 g of the modified polyol prepared in step (1) and 295.5 g of methyl isoamyl ketone, 168.2 g of hexamethylene diisocyanate was dropwise added at 60° C. under the protection of nitrogen over 2 h, and after completing the dropwise addition, the reaction was continued at 60° C.; after the isocyanate group in the reaction system was detected to be completely reacted, the reaction was terminated, the temperature was decreased and the materials were discharged to obtain a hydroxyl-terminated resin HTR-9 having a solid mass content of 80%.

3. Performance Testing

The hydroxyl-terminated resin HTR-9 may be miscible with a lipid solvent such as ethyl acetate, butyl acetate and propylene glycol methyl ether acetate, an aromatic hydrocarbon solvent such as toluene and xylene, and a ketone solvent such as acetone, butanone, cyclohexanone, methyl isobutyl ketone, and methyl isoamyl ketone. The hydroxyl-terminated resin HTR-9 is a colorless transparent viscous liquid having a hydroxyl value (at 80% solid mass content) of 227.6 mg KOH/g and a viscosity (at 80% solid mass content) of 660 cp at 25° C.

4. Coating Formulation and Performance

On a mass basis, 50 g of the hydroxyl-terminated resin HTR-9, 65.6 g of an isocyanate curing agent Desmodur L75, 0.60 g of a leveling agent BYK370, 0.60 g of a defoamer BYK141, and 33.1 g of a solvent propylene glycol methyl ether acetate were sequentially weighed and added to a dispersion cup, and after stirring and dispersing uniformly at a rotational speed of 600 r/min and standing still for defoaming, the obtained dual-component polyurethane coating was used to prepare a coating film on a wooden board, a tinplate sheet and a glass plate, respectively. The coating film was tested for performance after being cured and dried at room temperature for 7 days, and the results are shown in Table 18.

TABLE 18

| Gloss (60°) | Pencil hardness | Pendulum hardness | Impact resistance | Flexibility | Adhesion force |
|---|---|---|---|---|---|
| 98° | H | 0.76 | 50 cm | 1 mm | Level 1 |

As shown in Table 18, the dual-component polyurethane coating prepared from the hydroxyl-terminated resin HTR-9 meets the national standard "GB/T 23997-2009 Solvent based polyurethane wood coatings for indoor decorating and refurbishing".

Example 10

1. Raw Material Composition

The raw materials and ratios used in the preparation of a hydroxyl-terminated resin HTR-10 are shown in Table 19.

TABLE 19

| | |
|---|---|
| Erythritol | 122.1 g (2 mol) |
| Phenyl glycidyl ether | 625.2 g (4 mol) |
| Dicyclohexylmethane diisocyanate | 262.4 g (1 mol) |
| Methyl isoamyl ketone | 304.4 g |

2. Preparation

The preparation of the hydroxyl-terminated resin HTR-10 specifically comprises the following steps:

(1) To a four-necked flask equipped with mechanical stirring, a thermometer, an Allihn condenser and a nitrogen inlet were added 122.1 g of erythritol, 160 g of dioxane and 12 g of boron trifluoride diethyl etherate, 625.2 g of phenyl glycidyl ester was dropwise added at 50° C. under the protection of nitrogen over 5 h, and after completing the dropwise addition, the reaction was continued at 50° C.; when the epoxy value of the reaction system was decreased to be less than 1% of its initial mass content, the reaction was terminated, 40 mL of distilled water was added to quench the boron trifluoride diethyl etherate catalyst, then 120 g of a strong basic anion exchange resin was added and stirred for 60 min to neutralize the acid catalyst, then the strong basic anion exchange resin was removed by filtration, the distilled water and the organic solvent were removed by distilling under reduced pressure at high vacuum conditions, and the temperature was decreased to obtain a modified polyol.

(2) To a four-necked flask equipped with mechanical stirring, a thermometer, an Allihn condenser and a nitrogen inlet were added 747.3 g of the modified polyol prepared in step (1) and 304.4 g of methyl isoamyl ketone, 262.4 g of dicyclohexylmethane diisocyanate was dropwise added at 70° C. under the protection of nitrogen over 3 h, and after completing the dropwise addition, the reaction was continued at 70° C.; after the isocyanate group in the reaction system was detected to be completely reacted, the reaction was terminated, the temperature was decreased and the materials were discharged to obtain a hydroxyl-terminated resin HTR-10 having a solid mass content of 80%.

3. Performance Testing

The hydroxyl-terminated resin HTR-10 may be miscible with a lipid solvent such as ethyl acetate, butyl acetate and propylene glycol methyl ether acetate, an aromatic hydrocarbon solvent such as toluene and xylene, and a ketone solvent such as acetone, butanone, cyclohexanone, methyl isobutyl ketone, and methyl isoamyl ketone. The hydroxyl-terminated resin HTR-10 is a colorless transparent viscous liquid having a hydroxyl value (at 80% solid mass content) of 221.2 mg KOH/g and a viscosity (at 80% solid mass content) of 3000 cp at 25° C.

4. Coating Formulation and Performance

On a mass basis, 50 g of the hydroxyl-terminated resin HTR-10, 63.7 g of an isocyanate curing agent Desmodur L75, 0.55 g of a leveling agent BYK370, 0.55 g of a defoamer BYK141, and 32.6 g of a solvent propylene glycol methyl ether acetate were sequentially weighed and added to a dispersion cup, and after stirring and dispersing uniformly at a rotational speed of 600 r/min and standing still for defoaming, the obtained dual-component polyurethane coating was used to prepare a coating film on a wooden board, a tinplate sheet and a glass plate, respectively. The coating film was tested for performance after being cured and dried at room temperature for 7 days, and the results are shown in Table 20.

TABLE 20

| Gloss (60°) | Pencil hardness | Pendulum hardness | Impact resistance | Flexibility | Adhesion force |
|---|---|---|---|---|---|
| 98° | H | 0.80 | 50 cm | 1 mm | Level 1 |

As shown in Table 20, the dual-component polyurethane coating prepared from the hydroxyl-terminated resin HTR-10 meets the national standard "GB/T 23997-2009 Solvent based polyurethane wood coatings for indoor decorating and refurbishing".

Several low-viscosity, high solid content isocyanate-containing curing agents commonly available on the market are selected, and the coating film performance of the high solid content dual-component polyurethane coatings prepared in the above 10 examples is summarized in Table 21, wherein the performance of a coating film prepared from a H100C-80 alkyd resin supplied by Carpoly Chemical Group Co., Ltd. in the same manner is served as a comparative example in Table 21. Curing agent 1 used in Table 21 is prepared from a diphenylmethane diisocyanate-50 (MDI-50) curing agent and a toluene diisocyanate/trimethylolpropane adduct curing agent (L75) in a mass ratio of 1:1 to obtain a curing agent compound having a solid content of 87.5%, a viscosity of 80 cp at 25° C., and an NCO content of 23.25%; curing agent 2 is a polymeric diphenylmethane diisocyanate (PM-400) curing agent, which has a solid content of 100%, a viscosity of only about 300 cp at 25° C., an average functionality of isocyanate groups of about 2.7, an NCO content of 31.1%, has fast reaction rate and can prepare a film with high hardness; and curing agent 3 is Desmodur® XP 2410, which has a solid content of 100%, a viscosity of only about 500 cp at 25° C., an average functionality of isocyanate groups of about 3.1, and an NCO content of 24.0%, which is excellent in flexibility and weather resistance of the prepared film. It can be seen from the test results of the above examples that at the same 80% solid content, the viscosity of the alkyd resin H100C-80 prepared by the conventional process is as high as about 55000 cp while the viscosity of the hydroxyl-terminated resin prepared in the examples of the present invention is between 300 cp and 3000 cp, which indicates that the hydroxyl-terminated resin prepared in the examples exhibits obvious advantage in performance regarding viscosity, and is favorable for the preparation of high solid content dual-component polyurethane coatings. Meanwhile, as shown in Table 21, the present invention prepares a high solid content coating having a VOC between 300 and 380 g/L. Compared with the comparative example H100C-80, the dual-component polyurethane coatings prepared in the examples have obvious advantages in environmental protection in terms of VOC content during application, and at the same time the comprehensive performance thereof meets the national standard "GB/T 23997-2009 Solvent based polyurethane wood coatings for indoor decorating and refurbishing". The present invention has obvious advantages in reducing the VOC content of the coatings while significantly reducing the viscosity of the hydroxyl-terminated resin, which is a dilemma that seems to be contradictory and that the prior art is difficult to achieve at the same time; also, the application of the hydroxyl-terminated resin prepared by the invention in dual-component polyurethane coatings achieves excellent comprehensive performance.

erol, diglycerol, ditrimethylolpropane, pentaerythritol, dipentaerythritol, xylitol, erythritol, mannitol, sorbitol, maltitol or lactitol.

TABLE 21

High solid content dual-component polyurethane coatings prepared by some examples and film performance thereof

| | Curing agent Type | VOC/ (g/L) | Gloss (60°) | Impact resistance/ cm | Pendulum hardness | Pencil hardness | Adhesion force/ level | Flexibility/ mm |
|---|---|---|---|---|---|---|---|---|
| HTR-1 | 2 | 330 | 97 | 50 | 0.74 | H | 1 | 2 |
| HTR-2 | 1 | 310 | 96 | 50 | 0.73 | H | 1 | 2 |
| HTR-3 | 1 | 320 | 97 | 50 | 0.74 | H | 1 | 2 |
| HTR-4 | 3 | 340 | 96 | 50 | 0.71 | F | 1 | 1 |
| HTR-5 | 1 | 300 | 98 | 50 | 0.76 | H | 1 | 2 |
| HTR-6 | 2 | 330 | 97 | 50 | 0.75 | H | 1 | 2 |
| HTR-7 | 1 | 360 | 95 | 50 | 0.71 | F | 1 | 1 |
| HTR-8 | 1 | 360 | 96 | 50 | 0.71 | F | 1 | 1 |
| HTR-9 | 1 | 320 | 97 | 50 | 0.72 | H | 1 | 2 |
| HTR-10 | 3 | 350 | 97 | 50 | 0.71 | F | 1 | 1 |
| H100C-80 | 1 | 550 | 97 | 50 | 0.70 | F | 1 | 2 |

The invention claimed is:

1. A method for preparing a hydroxyl-terminated resin, characterized by comprising the steps of:
   (1) preparation of a modified polyol: adding 1 part by mole of a micromolecular polyol and 0-5 parts by mole of an organic solvent to a reactor, adding a Lewis acid catalyst, dropwise adding 1-3 parts by mole of a monoepoxide at 40-70° C. over 1-5 h, and after completing the dropwise addition, continuing the reaction at 40-70° C. for 4-8 h; when the epoxy value of the reaction system is decreased to less than 1% of the initial mass content of the epoxy value, terminating the reaction, adding distilled water to quench the Lewis acid catalyst, then adding a basic anion exchange resin and continuously stirring for 30-60 min to neutralize the acid catalyst, removing the basic anion exchange resin by filtration, and removing the distilled water and the organic solvent by distilling under reduced pressure at vacuum condition to obtain a polyol modified by the monoepoxide,
   wherein the monoepoxide is one or more of butyl glycidyl ether, n-octyl glycidyl ether, isooctyl glycidyl ether, C8-10 alkyl glycidyl ether, decyl glycidyl ether, C10-12 alkyl glycidyl ether, phenyl glycidyl ether, o-tolyl glycidyl ether, p-tert-butylphenyl glycidyl ether, benzyl glycidyl ether, furfuryl glycidyl ether, epichlorohydrin, and glycidyl tertcarbonate; and
   (2) preparation of a hydroxyl-terminated resin: adding 2 parts by mole of the modified polyol prepared from step (1) to a reactor, adding an organic solvent in an amount of 15% to 30% by mass percent of the total mass of the reactants, adding 1-1.5 parts by mole of a diisocyanate to the modified polyol at 50-90° C. over 1-3 h, then continuing the reaction at 50-90° C. for 2-6 h, and after the isocyanate group in the reaction system is completely reacted, terminating the reaction and decreasing the temperature to obtain a hydroxyl-terminated resin having a solid mass content of 75% to 90%.

2. The method for preparing a hydroxyl-terminated resin according to claim 1, characterized in that the micromolecular polyol is ethylene glycol, 1,4-butanediol, 1,6-hexanediol, 2-butyl-2-ethyl-1,3-propanediol, neopentyl glycol, diethylene glycol, 2,4-diethyl-1,5-pentanediol, 1,4-cyclohexanediol, 1,4-cyclohexanedimethanol, trimethylolpropane, glyc- 3. The method for preparing a hydroxyl-terminated resin according to claim 1, characterized in that the micromolecular polyol is a polyether polyol, polyester polyol, polycaprolactone polyol or polytetrahydrofuran polyol having an average molecular weight of 200-1000.

4. The method for preparing a hydroxyl-terminated resin according to claim 3, characterized in that the polyether polyol is one or more of difunctional polyethylene glycol, trifunctional polyether polyol, and tetrafunctional polyether polyol;
   the polyester polyol is difunctional polyester polyol;
   the polycaprolactone polyol is one or more of difunctional polycaprolactone polyol, trifunctional polycaprolactone polyol, and tetrafunctional polycaprolactone polyol;
   the polytetrahydrofuran polyol is difunctional polytetrahydrofuran polyol.

5. The method for preparing a hydroxyl-terminated resin according to claim 1, characterized in that the Lewis acid catalyst is one or more of boron trifluoride diethyl etherate, boron trifluoride ethanol and boron trifluoride tetrahydrofuran; and the Lewis acid catalyst is added in an amount of 2% to 6% by mole of the micromolecular polyol.

6. The method for preparing a hydroxyl-terminated resin according to claim 1, characterized in that the basic anion exchange resin is a macroporous basic styrene anion exchange resin.

7. The method for preparing a hydroxyl-terminated resin according to claim 1, characterized in that the diisocyanate compound is one or more of toluene diisocyanate, diphenylmethane diisocyanate, benzene dimethylene diisocyanate, tetramethylbenzenedimethylene diisocyanate, methylcyclohexyl diisocyanate, isophorone diisocyanate, dicyclohexylmethane diisocyanate, hexamethylene diisocyanate, and trimethylhexamethylene diisocyanate.

8. The method for preparing a hydroxyl-terminated resin according to claim 1, characterized in that both the organic solvents in step (1) and step (2) are one or more of ethyl acetate, butyl acetate, dioxane, propylene glycol methyl ether acetate, butanone, methyl isobutyl ketone, methyl isoamyl ketone, cyclohexanone, and isophorone.

9. A hydroxyl-terminated resin, characterized in that it is obtained by the preparation method according to claim 1, wherein the hydroxyl-terminated resin has a hydroxyl value of 140-300 mg KOH/g at 80% solid mass content, and a viscosity of 300-3000 cp at 25° C. at 80% solid mass content.

10. A coating comprising the hydroxyl-terminated resin of claim 9 and a polyurethane curing agent containing isocyanate groups; the NCO group in the polyurethane curing agent containing isocyanate groups and the OH group in the hydroxyl-terminated resin have a molar ratio of 0.8-1.2:1; and the polyurethane curing agent containing isocyanate groups is one or more of toluene diisocyanate trimer, toluene diisocyanate/trimethylolpropane adduct, hexamethylene diisocyanate trimer, diphenylmethane diisocyanate monomer and diphenylmethane diisocyanate polymer curing agents.

11. A hydroxyl-terminated resin, characterized in that it is obtained by the preparation method according to claim 2, wherein the hydroxyl-terminated resin has a hydroxyl value of 140-300 mg KOH/g at 80% solid mass content, and a viscosity of 300-3000 cp at 25° C. at 80% solid mass content.

12. A hydroxyl-terminated resin, characterized in that it is obtained by the preparation method according to claim 3, wherein the hydroxyl-terminated resin has a hydroxyl value of 140-300 mg KOH/g at 80% solid mass content, and a viscosity of 300-3000 cp at 25° C. at 80% solid mass content.

13. A hydroxyl-terminated resin, characterized in that it is obtained by the preparation method according to claim 4, wherein the hydroxyl-terminated resin has a hydroxyl value of 140-300 mg KOH/g at 80% solid mass content, and a viscosity of 300-3000 cp at 25° C. at 80% solid mass content.

14. A hydroxyl-terminated resin, characterized in that it is obtained by the preparation method according to claim 5, wherein the hydroxyl-terminated resin has a hydroxyl value of 140-300 mg KOH/g at 80% solid mass content, and a viscosity of 300-3000 cp at 25° C. at 80% solid mass content.

15. A hydroxyl-terminated resin, characterized in that it is obtained by the preparation method according to claim 6, wherein the hydroxyl-terminated resin has a hydroxyl value of 140-300 mg KOH/g at 80% solid mass content, and a viscosity of 300-3000 cp at 25° C. at 80% solid mass content.

16. A hydroxyl-terminated resin, characterized in that it is obtained by the preparation method according to claim 7, wherein the hydroxyl-terminated resin has a hydroxyl value of 140-300 mg KOH/g at 80% solid mass content, and a viscosity of 300-3000 cp at 25° C. at 80% solid mass content.

* * * * *